US009932022B2

(12) United States Patent
Weston

(10) Patent No.: US 9,932,022 B2
(45) Date of Patent: Apr. 3, 2018

(54) CONTACT PATCH MEASUREMENTS DURING HYDROPLANING EVENTS

(71) Applicant: David Alan Weston, Greenville, SC (US)

(72) Inventor: David Alan Weston, Greenville, SC (US)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 0 days.

(21) Appl. No.: 15/034,010

(22) PCT Filed: Nov. 15, 2013

(86) PCT No.: PCT/US2013/070218
§ 371 (c)(1),
(2) Date: May 3, 2016

(87) PCT Pub. No.: WO2015/073015
PCT Pub. Date: May 21, 2015

(65) Prior Publication Data
US 2016/0264109 A1 Sep. 15, 2016

(51) Int. Cl.
B60T 8/172 (2006.01)

(52) U.S. Cl.
CPC ......... B60T 8/1725 (2013.01); B60T 2210/13 (2013.01)

(58) Field of Classification Search
CPC .............. B60T 8/1725; B60T 2210/13
See application file for complete search history.

(56) References Cited

U.S. PATENT DOCUMENTS 5,502,433 A * 3/1996 Breuer ............... B60R 16/0237
152/210
5,736,630 A * 4/1998 Welner .................. G01N 19/02
73/9
(Continued)

FOREIGN PATENT DOCUMENTS

EP          1977942      10/2008
WO   WO 2006/054976      5/2006
(Continued)

OTHER PUBLICATIONS

PCT International Search Report for PCT/US2013/070218, dated Mar. 12, 2014—2 pages.

Primary Examiner — Behrang Badii
Assistant Examiner — Daniel L Greene
(74) Attorney, Agent, or Firm — Dority & Manning, P.A.

(57) ABSTRACT

Systems and methods for determining the contact patch parameters of a tire while rolling on deformable surfaces, such as during a hydroplaning event, are provided. More particularly, a piezoelectric sensor configured to provide a piezoelectric sensor output signal indicative of the time-varying curvature of a rolling tire can be mounted in a tire. The piezoelectric sensor output signal can be analyzed to detect a signal perturbation corresponding to the hydroplaning event. One or more characteristics of the contact patch during the hydroplaning event can be analyzed based on the signal perturbation. For instance, a parameter indicative of the shape of the contact patch during the hydroplaning event can be assessed based on the signal perturbation.

13 Claims, 7 Drawing Sheets

(56) References Cited

U.S. PATENT DOCUMENTS

| | | | |
|---|---|---|---|
| 7,203,579 B2 | 4/2007 | Yokota et al. | |
| 7,661,300 B2 | 2/2010 | Sinnett et al. | |
| 7,775,094 B2 | 8/2010 | Awad | |
| 2004/0090195 A1* | 5/2004 | Motsenbocker | B63B 43/18 |
| | | | 318/109 |
| 2004/0117100 A1 | 6/2004 | Kin | |
| 2006/0265114 A1* | 11/2006 | Thumrugoti | B60T 8/17554 |
| | | | 701/71 |
| 2008/0302177 A1* | 12/2008 | Sinnett | B60C 23/064 |
| | | | 73/146 |
| 2013/0278406 A1 | 10/2013 | Weston | |

FOREIGN PATENT DOCUMENTS

| | | |
|---|---|---|
| WO | WO 2010/046871 | 4/2010 |
| WO | WO 2013/101064 | 7/2013 |

\* cited by examiner

CONTACT PATCH MEASUREMENTS DURING HYDROPLANING EVENTS

FIELD

The present disclosure relates generally to piezoelectric devices mountable to tires, and more particularly to assessing contact patch characteristics during hydroplaning events with piezoelectric devices mountable to tires.

BACKGROUND

The incorporation of electronic devices with tire structures has been shown to yield many practical advantages. Piezoelectric devices have been incorporated with tire patches to provide a power source for various sensors and other components of a tire mountable apparatus used to measure tire parameters. Piezoelectric devices have also been used to acquire data, such as piezoelectric signals indicative of the time-varying shape of a rolling tire at the location of the piezoelectric device. The piezoelectric signals can be analyzed to assess various parameters of a tire, such as contact patch length. Such information may be useful in tire monitoring and warning systems as well as in tire testing and design.

Dynamic tire shape response to deformable surfaces, such as during hydroplaning events, can be important to tire testing and designs. For instance, the tire shape response can be analyzed to improve braking and driving traction and other characteristics of a tire. A problem to be solved in assessing dynamic tire shape response is providing an accurate way to determine the shape of the tire in the contact patch during circumstances such as hydroplaning. Existing techniques for studying the contact patch during hydroplaning can include capturing a two-dimensional image of a tire as the tire rolls over a glass and fluid covering. This provides a limited view of the contact patch and can be limited to rolling on a slick surface.

Thus, a need exists for an improved solution for measuring the shape of the tire while rolling on deformable surfaces, such as during hydroplaning conditions.

SUMMARY

Aspects and advantages of the invention will be set forth in part in the following description, or may be apparent from the description, or may be learned through practice of the invention.

One example aspect of the present disclosure is directed to a method of analyzing a contact patch of a tire during a hydroplaning event. The method includes obtaining a piezoelectric sensor output signal from at least one piezoelectric sensor mounted in a tire. The piezoelectric sensor output signal is generated at least in part during a hydroplaning event. The method includes analyzing, with one or more processing devices, the piezoelectric sensor output signal to determine a contact patch entry and a contact patch exit. The method further includes detecting, with the one or more processing devices, a signal perturbation corresponding to the hydroplaning event in the piezoelectric sensor output signal. The signal perturbation occurs between the contact patch entry and the contact patch exit. The method further includes assessing a parameter of the contact patch based at least in part on the signal perturbation.

Another example aspect of the present disclosure is directed to a system for analyzing a contact patch of a tire during a hydroplaning event. The system can include at least one piezoelectric sensor configured to generate a piezoelectric sensor output signal representative of a time varying curvature of a tire during tire rotation. The system can include one or more processing devices. The one or more processing devices can be configured to execute computer-readable instructions stored in one or more computer-readable media that when executed by the one or more processing devices cause the one or more processing devices to perform operations. The operations can include, for instance, obtaining the piezoelectric sensor output signal and analyzing the piezoelectric sensor output signal to determine a contact patch entry and a contact patch exit. The operations can further include detecting a signal perturbation corresponding to the hydroplaning event in the piezoelectric sensor output signal. The signal perturbation can occur between the contact patch entry and the contact patch exit. The operations can further include assessing a parameter of the contact patch based at least in part on the signal perturbation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
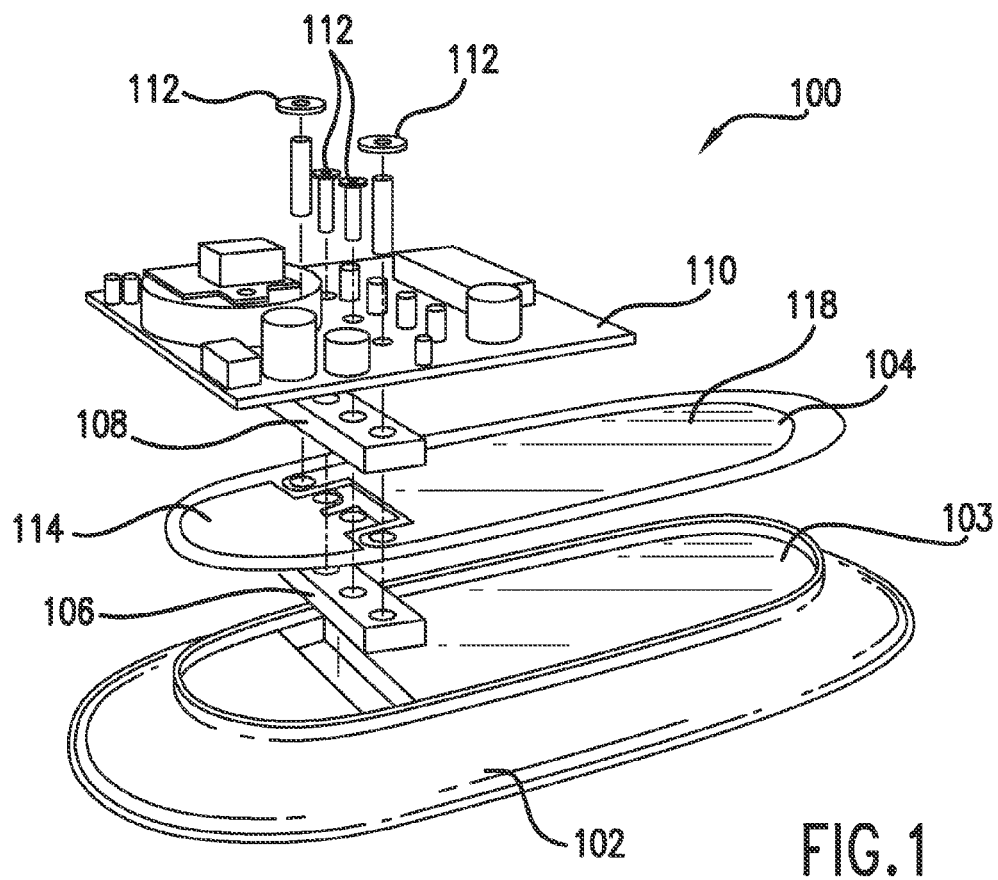
FIG. 1 depicts an example piezoelectric device configured to generate a piezoelectric sensor output signal to be analyzed according to example embodiments the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, example aspects of the present disclosure are directed to determining the contact patch shape of a tire while rolling on deformable surfaces, such as during a hydroplaning event. As used herein, a hydroplaning event occurs where at least a portion of a surface of a tire is separated from a rolling surface by a fluid, such as water. A piezoelectric sensor configured to provide a piezoelectric sensor output signal indicative of the time-varying curvature of a rolling tire can be mounted in a tire. The piezoelectric sensor output signal can be analyzed to detect a signal perturbation corresponding to the hydroplaning event. One or more characteristics of the contact patch during the hydroplaning event can be analyzed based on the signal perturbation. For instance, a parameter indicative of the shape of the contact patch during the hydroplaning event can be determined based on the signal perturbation. In this manner, the present subject matter provides an improved solution for assessing contact patch characteristics of a tire during a hydroplaning event.

More specifically, a piezoelectric sensor output signal can be analyzed to identify a contact patch entry and a contact patch exit for the tire. For instance, contact patch entry can be detected by identifying a maximum slope in a first direction (e.g. positive direction) of the piezoelectric sensor output signal and contact patch exit can be detected by identifying a maximum slope in a second direction (e.g. negative direction) of the piezoelectric sensor output signal. The signal perturbation corresponding to the hydroplaning event can be detected between the contact patch entry and the contact patch exit. For instance, an inflection point can be identified in the piezoelectric sensor output signal occurring between the contact patch entry and the contact patch exit.

In one particular aspect of the present disclosure, a quantitative degree of hydroplaning can be determined for the tire based on the signal perturbation. For instance, a quantitative degree of hydroplaning can be determined based on a ratio of the difference between a time corresponding to the signal perturbation and a time corresponding to the contact patch entry to the difference between a time corresponding to the contact patch exit and the time corresponding to contact patch entry.

In certain embodiments, the piezoelectric sensor output signal can be analyzed to detect a hydroplaning event. For instance, the presence of the signal perturbation can be indicative of the hydroplaning event. Alternatively and/or in addition, the rate of change of the piezoelectric sensor output signal at contact patch entry can be analyzed to detect a hydroplaning event. For instance, a hydroplaning event can be detected if the absolute value of the rate of change of the piezoelectric sensor output signal at contact patch entry falls below a threshold.

In yet other example embodiments of the present disclosure, a plurality of piezoelectric sensors can be mounted across a lateral width of an inner surface of a tire. Each of the plurality of piezoelectric sensors can be configured to generate a piezoelectric sensor output signal indicative of the time-varying curvature of the tire while the tire is rolling at the particular location of the piezoelectric sensor. Each of these piezoelectric sensor output signals can be analyzed to identify a signal perturbation associated with a hydroplaning event. The shape of the contact patch of the tire during the hydroplaning event can be analyzed using the piezoelectric sensor output signals from the plurality of piezoelectric sensors.

With reference now to the FIGS., example aspects of the present disclosure will now be set forth. FIG. 1 depicts an example tire mountable apparatus 100 that includes a piezoelectric sensor. In one example embodiment, tire mountable apparatus 100 includes structural elements such as a support patch 102, a piezoelectric patch 104, first and second spacer bars 106 and 108, an electronics substrate 110 (e.g. a printed circuit board) and a plurality of electromechanical connections 112. FIG. 1 depicts one example tire mountable apparatus 100 including a piezoelectric sensor for purposes of illustration and discussion. Those of ordinary skill in the art, using the disclosures provided herein, will understand that other piezoelectric sensor devices can be used without deviating from the scope of the present disclosure.

The support patch 102 can include a substantially planar portion of rubber or other elastomeric material. Support patch 102 offers modular structure for tire mountable apparatus 100 and also provides a base for suitable integration with the interior surface of a tire. For example, the support patch 102 may be attached to or integrated with or embedded on the inner surface or inner liner of a tire using adhesives, curing techniques, or other suitable means. Support patch 102 along with piezoelectric pack 104 can be formed with surfaces having minimized curvatures to help avoid local fatigue within the tire mountable apparatus 100.

Figure 2:
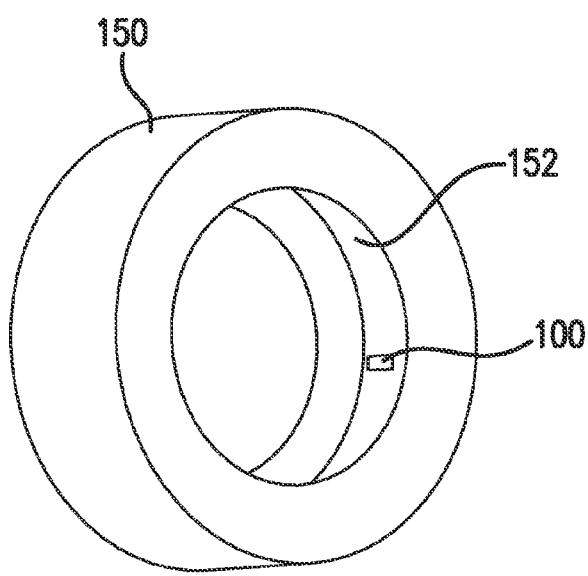
FIG. 2 depicts an example piezoelectric device mounted in a tire according to example embodiments of the present disclosure.

FIG. 2 depicts the tire mountable apparatus 100 mounted to the inner surface 152 of a tire 150. Tire mountable apparatus 100 can be positioned at a variety of locations within the tire where the piezoelectric elements will be subjected to various tire stress levels. Some example embodiments use a mounting location of the tire mountable apparatus 100 in the center of the tire crown, for instance, along a lateral centerline of the tire width.

Referring back to FIG. 1, support patch 102 can include an embedded recess 103 along an upper surface of the support patch 102 for receiving various hardware features of the tire mountable apparatus 100. In one example, recess 103 formed within support patch 102 is configured to receive a first spacer bar 106 as well as the piezoelectric pack 104. A second spacer bar 108 then may be provided above the piezoelectric pack 104 between the piezoelectric pack 104 and an electronics substrate 110. Further connection between select components such as between the support patch 102, piezoelectric pack 104 and first spacer bar 106 may be formed with additional adhesive materials, such as but not limited to a polymer-based coating material such as Chemlock® material.

Spacer bars 106 and 108 provide insulation among the various electronic modules within tire mountable apparatus 100, but also respectively include a plurality of openings therein which form orthogonal connection lines among such components. Such connection lines may be enhanced by providing conductive linings or inserts within selected openings. The electromechanical connectors 112 then can be fed through the openings formed within spacer bars 106 and 108 as well as within electronics substrate 110 and piezoelectric pack 104 to form electrical connections with the electronic components and overall structural connections for the tire mountable apparatus 100. For example, the inner threaded posts can be configured to connect to a first piezoelectric element 114 used for measuring contact patch parameters or other information generated by piezoelectric sensor 114. The outer threaded posts can be configured to connect to a second piezoelectric element 118 used for power generation to help operate the various electronic components within the tire mountable apparatus 100.

Piezoelectric pack 104 can include a substrate surface on which one or more piezoelectric elements are formed. In one example, a first piezoelectric element 114 formed on the substrate surface of piezoelectric pack 104 is provided to function as piezoelectric sensor 114, while a second piezoelectric element 118 is formed on the substrate surface of piezoelectric pack 104 to function as power source 118. The electric current generated by such second piezoelectric element 118 can be conditioned and stored within a rechargeable battery, capacitor or other energy source, which then can be coupled to such electronic components as temperature sensor, pressure sensor, microprocessor, and/or transceiver to supply operating power.

First and second piezoelectric elements may correspond to a variety of piezoelectric structures, including but not limited to piezoelectric crystals, composite fiber structures, piezoceramic modules, or other devices made out of piezoelectric material. The piezoelectric material used in such elements may include one or more of berlinite, quartz, topaz, tourmaline-group minerals, dentin, gallium orthophosphate, langasite, barium titanate, lead titanate, lead zirconate titanate (PZT), potassium niobate, lithium niobate, lithium tantalite, sodium tungstate, sodium potassium niobate, bismuth ferrite, sodium niobate, and polyvinylidene fluoride (PVDF). In some specific embodiments, each piezoelectric element is formed from a single layer of piezoceramic material sandwiched between opposing layers of electrode material (e.g., a conductive material such as copper, nickel, gold, silver, aluminum or the like.) The multiple piezoelectric elements may all be encased in an additional protective material, such as a thin casing of fiberglass on the top and bottom of the piezoelectric elements.

A piezoelectric sensor, such as piezoelectric element 114 used in tire mountable apparatus 100, can be configured to generate a time varying output signal have a voltage proportional to the curvature of the tire at the location of the piezoelectric element as the tire rolls along a surface. This piezoelectric sensor output signal can be analyzed to assess the shape of the contact patch.

Figure 3:
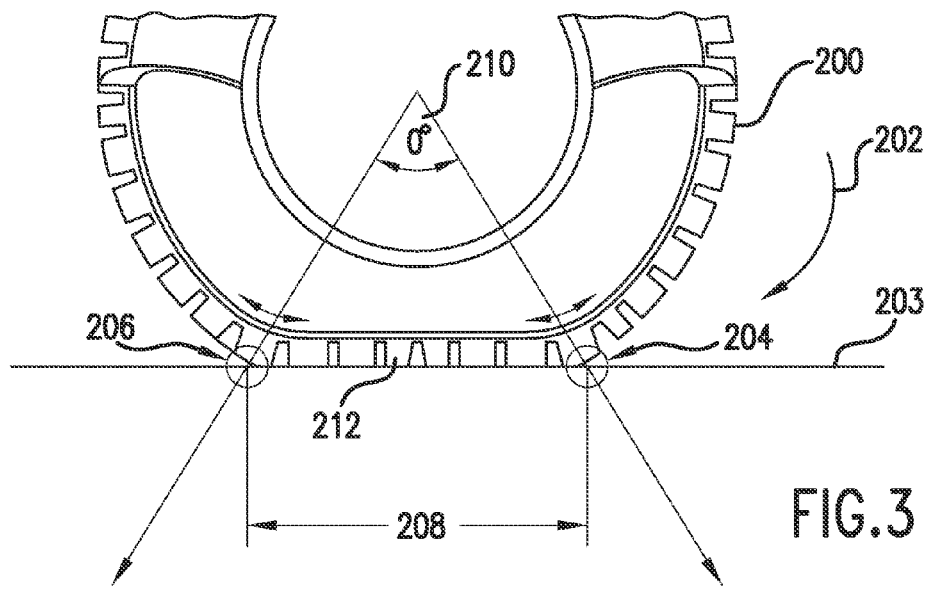
FIG. 3 depicts the curvature of an example tire while rolling on a static surface.

For instance, FIG. 3 depicts the curvature of a tire 200 that is rolling along a static ground surface 203 in the clockwise direction as indicated by directional arrow 202. The contact patch 212 is the portion of the tire 200 that contacts the ground surface 203. A piezoelectric sensor positioned within tire 200 can produce a piezoelectric sensor output signal that can be analyzed to effectively determine when the sensor enters the contact patch 212, corresponding to contact patch entry at location 204. Similarly, the piezoelectric sensor output signal can be analyzed to effectively determine when the sensor exits the contact patch 212, corresponding to contact patch exit at location 206. The time during which a sensor operates within a contact patch 212 ("contact patch time") as represented by span 208, can thus be determined as the difference between a time associated with contact patch entry and a time associated with contact patch exit. Another meaningful representation of the contact patch time corresponds to the contact patch angle represented as quantity 210 in FIG. 3. The contact patch angle can be determined based at least in part on the ratio between the contact patch time and the time for one revolution of the tire. The ratio can be multiplied by 360° to represent the contact patch angle in degrees.

Figure 4:
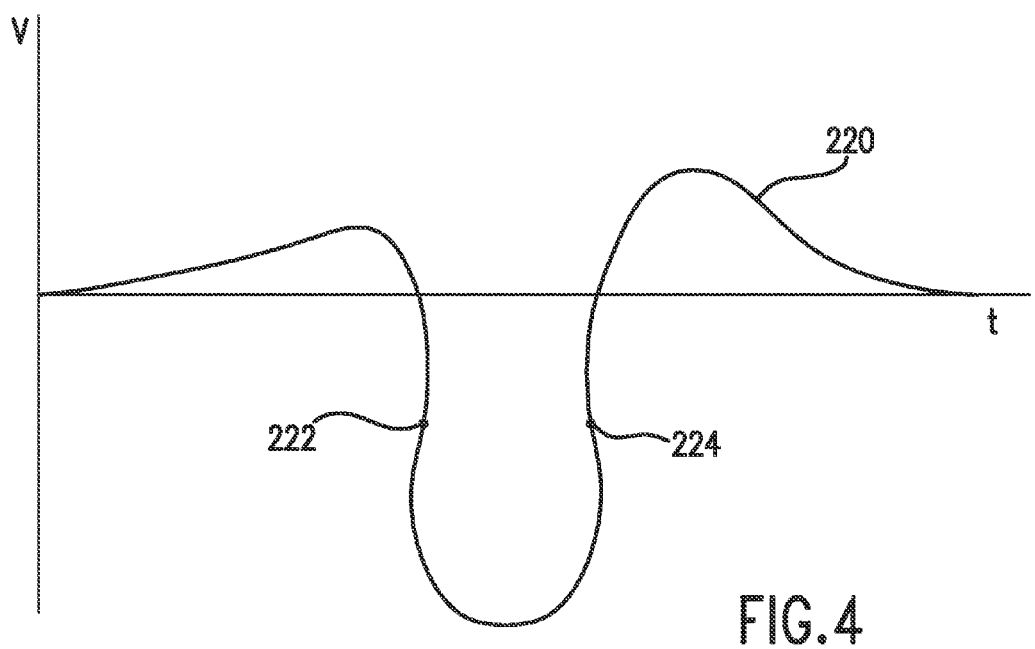
FIG. 4 depicts an example piezoelectric sensor output signal generated at least in part while a tire is rolling on a static surface.

FIG. 4 depicts a piezoelectric sensor output signal 220 generated while the tire 200 rolls along a static surface 203 as shown in FIG. 3. The piezoelectric sensor output signal 220 provides a time varying voltage that is proportional to the curvature of the tire at the location of the piezoelectric sensor. FIG. 4 plots time along the abscissa and voltage along the ordinate.

The piezoelectric sensor output signal 220 has events indicative of contact patch entry and contact patch exit. More particularly, point 222 corresponds to contact patch entry. Point 222 can be determined, for instance, by identifying a maximum slope in a first direction of the piezoelectric sensor output signal 220. Point 224 corresponds to contact patch exit. Point 224 can be determined, for instance, by identifying a maximum slope in a second direction of the piezoelectric sensor output signal 220. The times associated with point 222 (e.g. contact patch entry time) and point 224 (contact patch exit time) can be used to identify the contact patch time and/or the contact patch angle as discussed above. In this manner, the piezoelectric sensor output signal 220 can be analyzed to assess the shape of the contact patch 212 of the tire 200 as the tire 200 rolls along the static surface 203.

Figure 5:
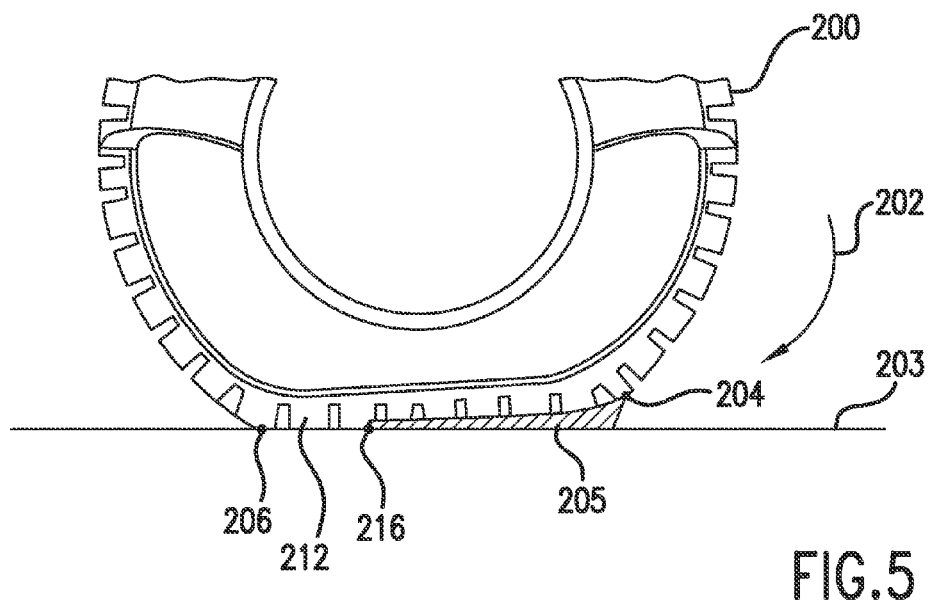
FIG. 5 depicts the curvature of an example tire during a hydroplaning event.

FIG. 5 depicts the curvature of the tire 200 rolling in the clockwise direction as indicated by directional arrow 202 during an example hydroplaning event. During the hydroplaning event, a wedge of fluid 205 is disposed between at least a portion of the tire 200 and the surface 203. In the example of FIG. 5, the wedge of fluid 205 extends a substantial distance between the tire 200 and the surface 203. A piezoelectric sensor positioned within tire 200 can produce a piezoelectric sensor output signal that can be analyzed to assess the shape of the contact patch 212 of the tire during the hydroplaning event. More particularly, the piezoelectric sensor output signal can be analyzed to identify the contact patch entry at location 204 where the tire 200 first contacts the wedge of fluid as well a contact patch exit at location 206. The piezoelectric sensor output signal can be further analyzed to identify a signal perturbation corresponding to the hydroplaning event. The signal perturbation can be attributable to, for instance, the changing curvature of the tire 200 at location 216 where the tire 200 transitions from contacting the wedge of fluid 205 to contacting the static surface 203.

Figure 6:
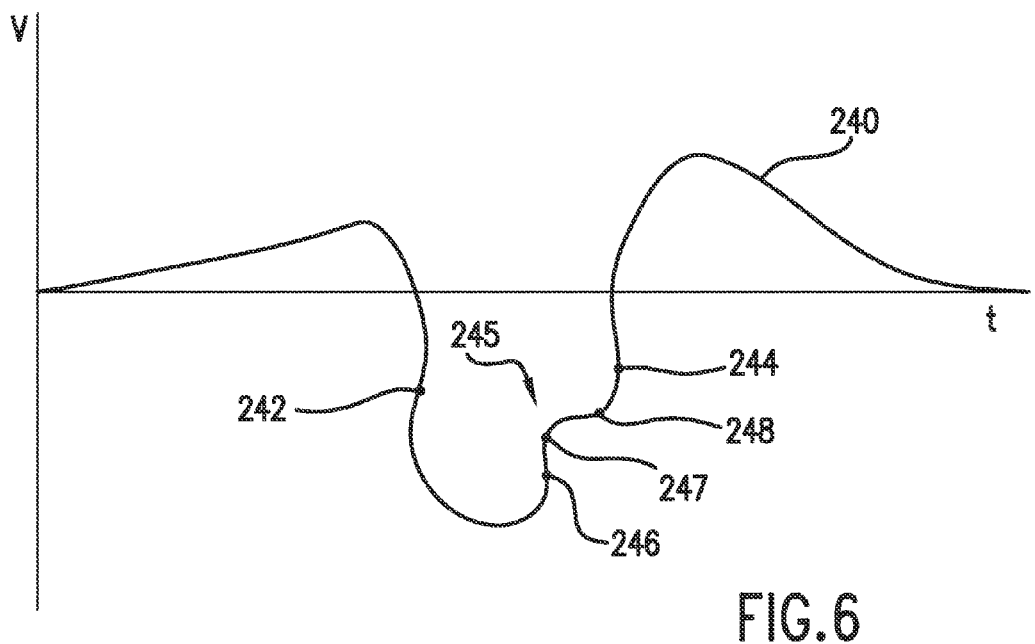
FIG. 6 depicts an example piezoelectric sensor output signal generated at least in part during the hydroplaning event of FIG. 5.

FIG. 6 depicts a piezoelectric sensor output signal 240 generated during the hydroplaning event depicted in FIG. 5. The piezoelectric sensor output signal 240 provides a time varying voltage that is proportional to the curvature of the tire at the location of the piezoelectric sensor. FIG. 6 plots time along the abscissa and voltage along the ordinate.

The piezoelectric sensor output signal 240 has portions indicative of contact patch entry and contact patch exit. More particularly, point 242 corresponds to contact patch entry. Point 242 can be determined, for instance, by identifying a maximum slope in a first direction of the piezoelectric sensor output signal 240. Point 244 corresponds to contact patch exit. Point 244 can be determined, for instance, by identifying a maximum slope in a second direction of the piezoelectric sensor output signal 240.

The piezoelectric sensor output signal 240 further includes a signal perturbation 245 corresponding to the hydroplaning event. The signal perturbation 245 can result at least in part from the changing curvature of the tire at location 216 of FIG. 5 where the tire 200 transitions from contacting the fluid 205 to contacting the static surface 203. The piezoelectric sensor output signal 240 can be analyzed to detect the signal perturbation 245 corresponding to the hydroplaning event.

In one example embodiment, the signal perturbation 245 can be detected, for instance, by analyzing the piezoelectric sensor output signal 240 to identify an inflection point occurring between contact patch entry 242 and contact patch exit 244. More specifically, a first inflection point 246 and/or a second inflection point 248 can be identified in the piezoelectric sensor output signal 240. The signal perturbation 245 can be detected to occur at a time corresponding to either the first inflection point 246 or the second inflection point occurring between contact patch entry 242 and contact patch exit 244. Alternatively, the signal perturbation 245 can be detected to occur at a time determined based at least in part on a time associated with the first inflection point 246 and the time associated the second inflection point 248. For instance, the signal perturbation 245 can be determined to occur at point 247. The time associated with point 247 can be determined based at least in part on an average of the time associated with the first inflection point 246 and time associated with the second inflection point 248. Other suitable techniques for identifying the time associated with the signal perturbation based on the first inflection point 246 and the second inflection point 248 can be used without deviating from the scope of the present disclosure.

Figure 7:
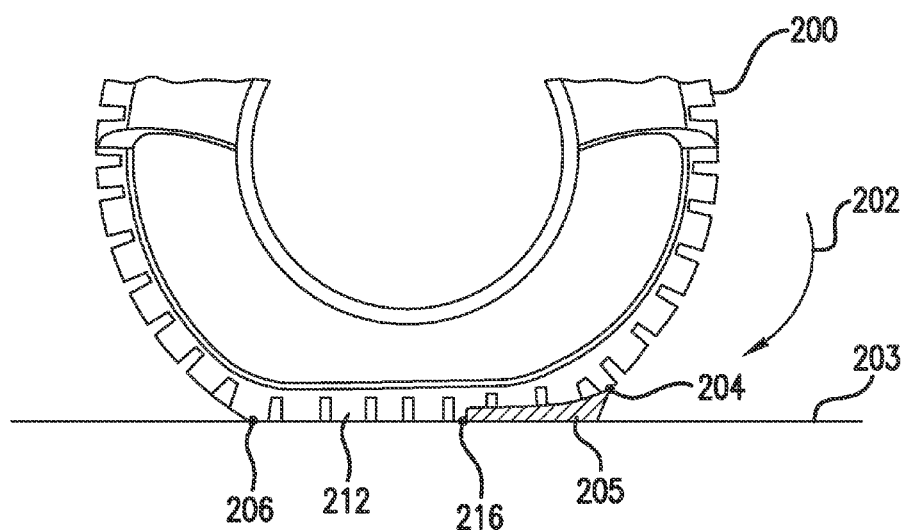
FIG. 7 depicts the curvature of an example tire during a hydroplaning event.

FIG. 7 depicts the curvature of the tire 200 rolling in the clockwise direction as indicated by directional arrow 202 during another example hydroplaning event. The hydroplaning event depicted in FIG. 7 is not as significant as the hydroplaning event in FIG. 5. More particularly, the wedge of fluid 205 shown in FIG. 7 extends a reduced distance between the tire 200 and the surface 203. The reduced distance can be manifested in a piezoelectric sensor output signal.

Figure 8:
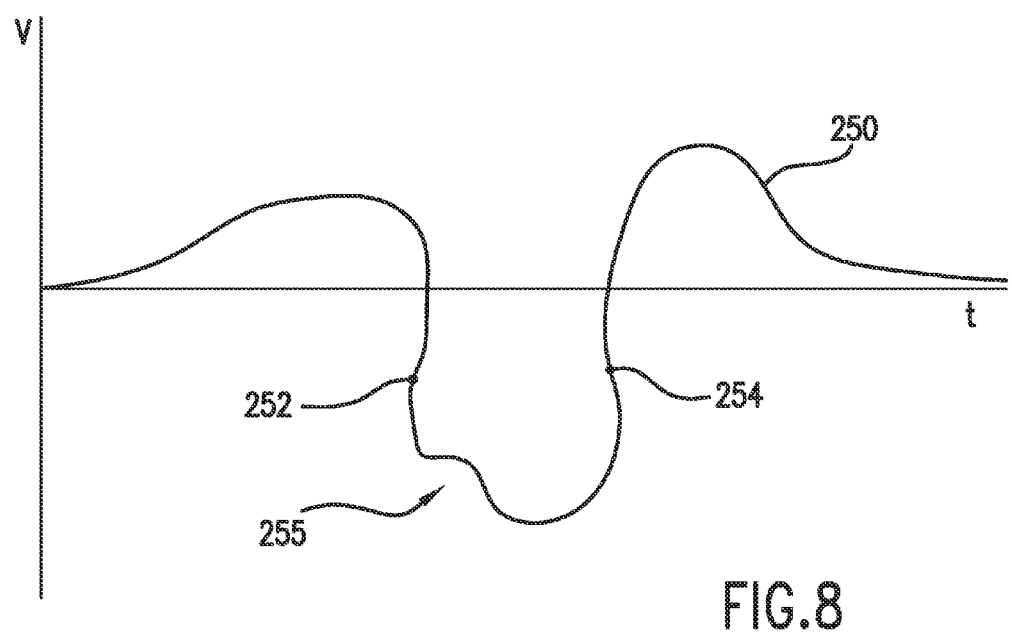
FIG. 8 depicts an example piezoelectric sensor output signal generated at least in part during the hydroplaning event of FIG. 7.

For instance, FIG. 8 depicts a piezoelectric sensor output signal 250 generated during the hydroplaning event depicted in FIG. 7. The piezoelectric sensor output signal 250 provides a time varying voltage that is proportional to the curvature of the tire at the location of the piezoelectric sensor. FIG. 8 plots time along the abscissa and voltage along the ordinate.

Similar to the piezoelectric sensor output signal 240 of FIG. 6, the piezoelectric sensor output signal 250 of FIG. 8 has portions indicative of contact patch entry and contact patch exit. More particularly, point 252 corresponds to contact patch entry. Point 254 corresponds to contact patch exit. The piezoelectric sensor output signal 250 further includes a signal perturbation 255 corresponding to the hydroplaning event.

The signal perturbation 255 can result at least in part from the changing curvature of the tire at location 216 of FIG. 7 where the tire 200 transitions from contacting the fluid 205 to contacting the static surface 203. As shown, the signal perturbation occurs earlier in the piezoelectric sensor output signal 250 relative to the piezoelectric sensor output signal 240 of FIG. 6. As a result, the location of the signal perturbation 255 in the piezoelectric sensor output signal 250 can be indicative of the length of the contact patch that is contact with a static surface and that is contact with a fluid. In this way, the shape of the contact patch can be analyzed based at least in part on the signal perturbation.

Figure 9:
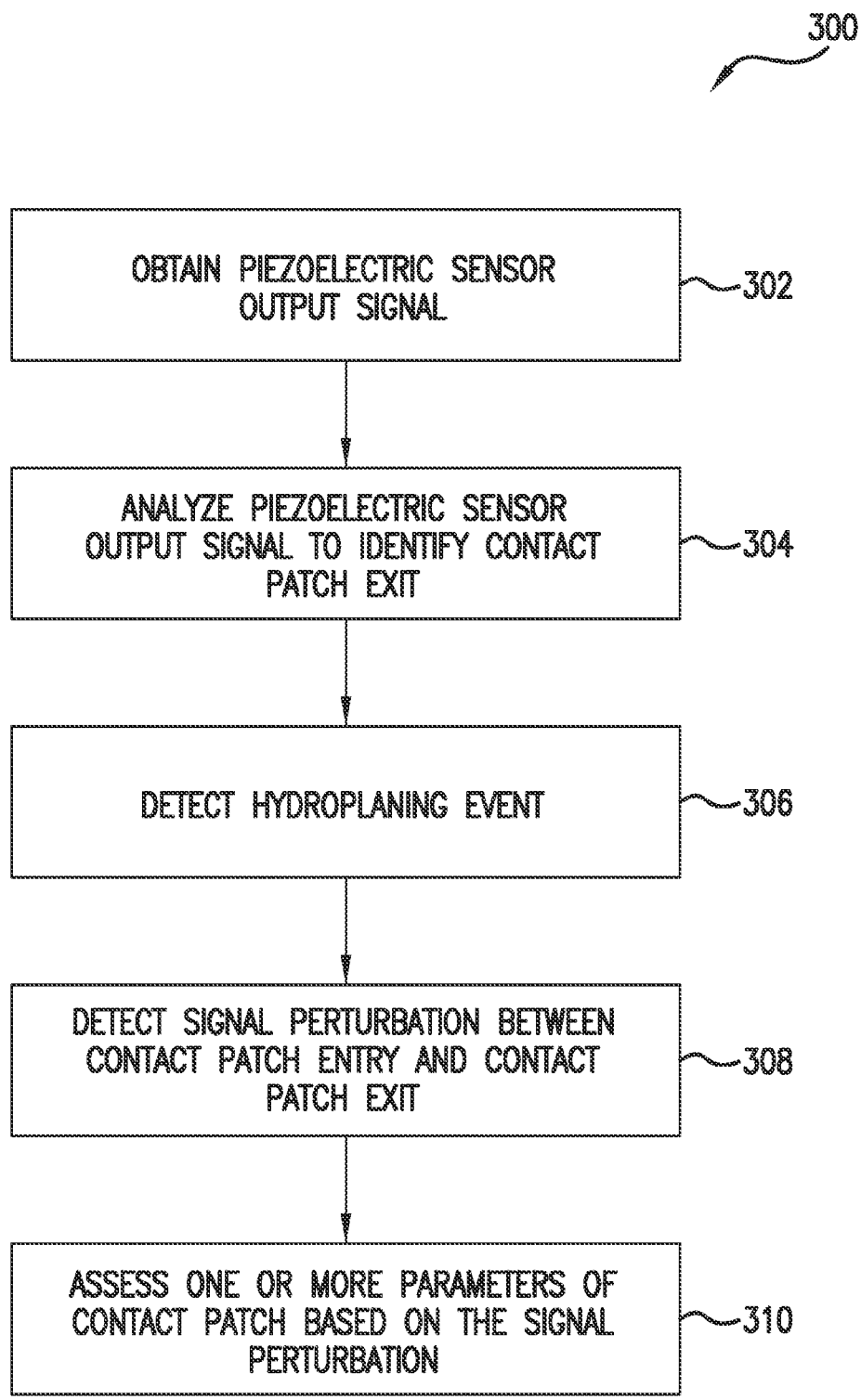
FIG. 9 depicts a flow diagram of an example method for analyzing a contact patch of a tire during a hydroplaning event according to example embodiments of the present disclosure.

FIG. 9 depicts a flow diagram of an example method (300) for analyzing a contact patch of a tire during a hydroplaning event according to example embodiments of the present disclosure. FIG. 9 can be implemented by one or more computing devices, such as one or more of the computing devices depicted in FIG. 12. In addition, FIG. 9 depicts steps performed in a particular order for purposes of illustration and discussion. Those of ordinary skill in the art, using the disclosures provided herein, will understand that various steps of any of the methods disclosed herein can be modified, adapted, omitted, rearranged, or expanded in various ways.

At (302), the method includes obtaining a piezoelectric sensor output signal. As used herein "obtaining a piezoelectric sensor output signal" can refer to accessing a piezoelectric sensor output signal stored, for instance, in a memory, or to generating the piezoelectric sensor output signal using a piezoelectric device, such as the tire mountable apparatus 100 shown in FIG. 1. The piezoelectric sensor output signal can be indicative of the time varying curvature of a rolling tire. The piezoelectric sensor output signal can be for a plurality of revolutions of the tire. At least a portion of the piezoelectric sensor output signal can be generated during a hydroplaning event.

At (304), the method includes analyzing the piezoelectric output signal to identify contact patch entry and contact patch exit. As discussed above, contact patch entry and contact patch exit can be determined by identifying portions of the piezoelectric output signal corresponding to a maximum slope in a first direction and a maximum slope in a second direction for a tire revolution.

Once the contact patch entry and contact patch exit have been identified from the piezoelectric sensor output signal, the method can optionally include detecting the occurrence of the hydroplaning event as shown at (306). More particularly, the piezoelectric sensor output signal can be analyzed to determine signal conditions indicative of a hydroplaning event.

For instance, in one embodiment, a hydroplaning event can be detected by analyzing the rate of change (i.e. slope) of the piezoelectric sensor output signal at contact patch entry. More specifically, if the absolute value of the rate of change of the piezoelectric sensor output signal at a contact patch entry falls below a predefined threshold, it can be determined that a hydroplaning event occurred at the particular contact patch entry.

For instance, the piezoelectric sensor output signal 220 of FIG. 4 can have a slope at contact patch entry 222. Similarly, the piezoelectric sensor output signal 240 of FIG. 6 can have a slope at contact patch entry 242. The slope associated with contact patch entry 222 of the piezoelectric sensor output signal 220 can be steeper than the slope associated with the contact patch entry 242 for the piezoelectric sensor output signal 240. This is due to, for instance, the reduced changing curvature of the tire at contact patch entry during the hydroplaning event. As a result, the rate of change of a piezoelectric sensor output signal can be analyzed to determine whether a hydroplaning event has occurred. For instance, if the absolute value of the slope (e.g. rate of change) of the piezoelectric sensor output signal is determined to be less than a threshold, a hydroplaning event can be detected.

Referring back to FIG. 9 at (308), a signal perturbation can be detected between the contact patch entry and the contact patch exit. The signal perturbation can be representative of the changing curvature of the tire at a location where the tire transitions from contacting a fluid to contacting a static surface. As discussed above, the signal perturbation can be detected, for instance, by analyzing the piezoelectric sensor output signal to identify an inflection point occurring between contact patch entry and contact patch exit.

More specifically, a first inflection point and/or a second inflection point occurring between contact patch entry and contact patch exit can be identified in the piezoelectric sensor output signal. The signal perturbation can be detected to occur at a time corresponding to either the first inflection point or the second inflection point occurring between contact patch entry and contact patch exit. Alternatively, the signal perturbation can be detected to occur at a time determined based at least in part on a time associated with the first inflection point and the time associated the second inflection point. For instance, the time associated with the signal perturbation can be determined based at least in part on an average of the time associated with the first inflection point and the time associated with the second inflection point. Other suitable techniques for identifying the time associated with the signal perturbation can be used without deviating from the scope of the present disclosure.

In example embodiments of the present disclosure, the presence of the signal perturbation can be used to detect a hydroplaning event. For instance, a hydroplaning event can be detected when a signal perturbation is detected between an identified contact patch entry and contact patch exit in a portion of the piezoelectric sensor output signal. This can be performed in addition to or in place of detecting a hydroplaning event based on the rate of change of the piezoelectric sensor output signal as discussed with reference to (306) of FIG. 10.

Referring to (310) of FIG. 9, the method can include assessing one or more parameters of the contact patch based at least in part on the signal perturbation. More specifically, one or more parameters indicative of the shape of the contact patch during the hydroplaning event can be determined based on the signal perturbation. These one or more parameters can include, for instance, a dry contact patch length of the tire. The dry contact patch length can provide a measure of the portion of the contact patch that is not separated from the rolling surface by a fluid. The dry contact patch length of the tire can be determined, for instance, based on a difference between a time associated with the signal perturbation and a time associated with contact patch exit.

Another example parameter can include a quantitative degree of hydroplaning for the tire. The quantitative degree of hydroplaning can be representative of the portion of contact patch that is separated from a static surface by a fluid during the hydroplaning event. The quantitative degree of hydroplaning can be determined based at least in part on a difference between a time associated with contact patch entry and a time associated with the signal perturbation. For instance, the quantitative degree of hydroplaning can be determined as the ratio of the difference between a time associated with contact patch entry and a time associated with the signal perturbation to the contact patch length of the tire.

The contact patch time of the tire used to calculate the quantitative degree of hydroplaning can be determined from the portion of the piezoelectric signal attributable to the hydroplaning event or from a portion of the piezoelectric signal generated while the tire is rolling on a static surface. As an example, the quantitative degree of hydroplaning can be determined as follows:

$$H = \frac{t_{event} - t_{cpentry}}{t_{cpexit} - t_{cpentry}}$$

where H is the quantitative degree of hydroplaning, $t_{event}$ is a time associated with the signal perturbation, $t_{cpentry}$ is a time associated with the contact patch entry, and $t_{cpexit}$ is a time associated with the first contact patch exit. Other suitable quantitative degrees of hydroplaning determined based at least in part on the signal perturbation can be used without deviating from the scope of the present disclosure.

Figure 10:
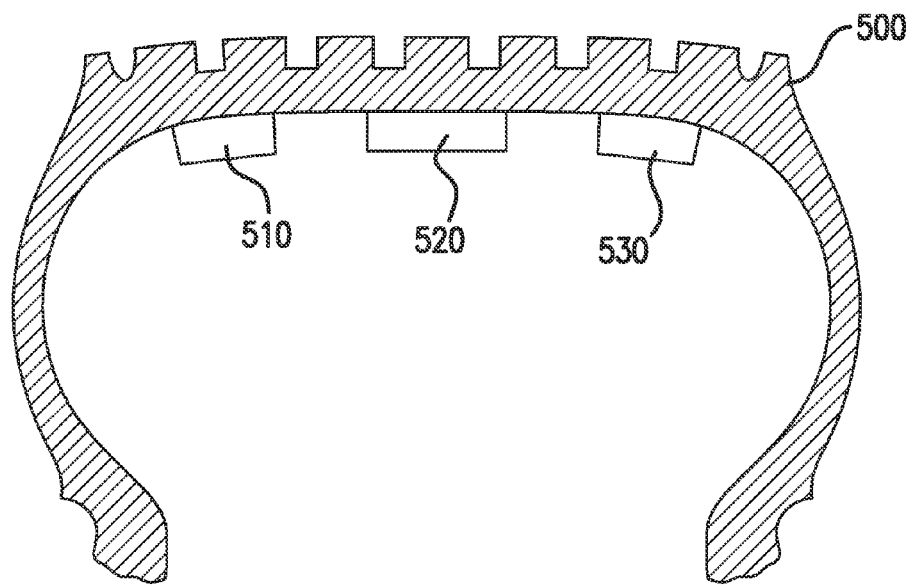
FIG. 10 depicts a plurality of piezoelectric devices mounted in a tire according to example embodiments of the present disclosure.

In additional embodiments of the present disclosure, a plurality of piezoelectric sensors can be mounted to the tire to obtain a more accurate assessment of contact shape during a hydroplaning event. For instance, FIG. 10 depicts a plurality of piezoelectric devices 510, 520, and 530 that are mounted across a lateral width of the inner surface of the tire 500. The piezoelectric devices 510, 520, and 530 can each correspond, for instance, to the tire mountable apparatus 100 depicted in FIG. 1. Three piezoelectric devices 510, 520, and 530 are depicted in FIG. 10. More or fewer piezoelectric devices can be used without deviating from the scope of the present disclosure.

Each of the piezoelectric devices 510, 520, and 530 can be configured to generate a piezoelectric sensor output signal indicative of the time varying curvature of a rolling tire at the particular location of the piezoelectric device. According to aspects of the present disclosure, each of the plurality of piezoelectric sensor output signals generated by the piezoelectric devices 510, 520, and 530 can be obtained and analyzed to detect a signal perturbation corresponding to a hydroplaning event. One or more parameters of the contact patch can then be analyzed based on the detected signal perturbations. For instance, the two-dimensional shape of the contact patch can be analyzed based at least in part on the detected signal perturbation.

Figure 11:
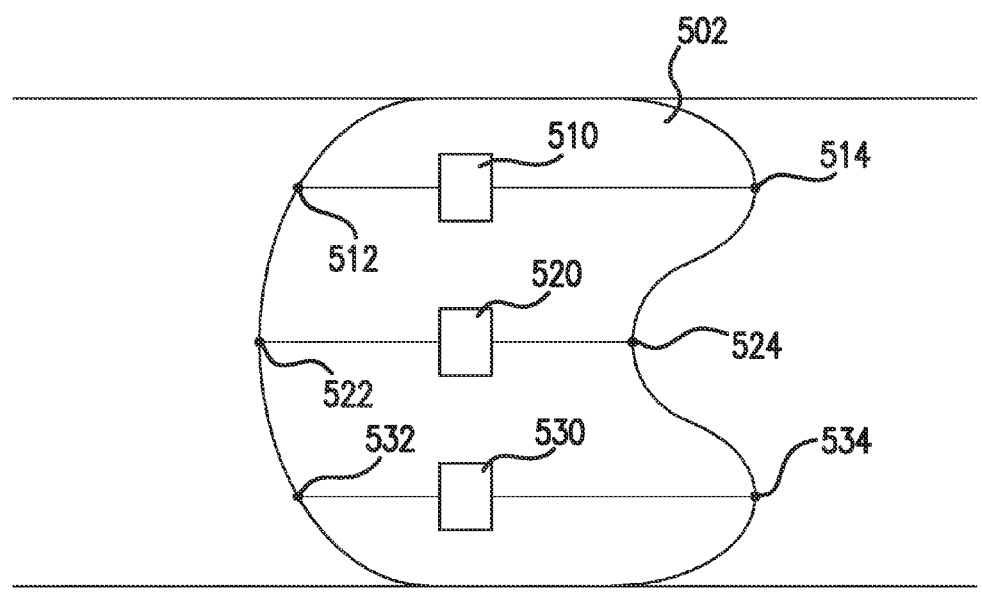
FIG. 11 depicts an example representation of a contact patch shape for a tire during a hydroplaning event determined according to example embodiments of the present disclosure.

FIG. 11 depicts an example two-dimensional representation 502 of a shape of a portion of a contact patch that is in contact with a static surface during a hydroplaning event (e.g. not separated from the surface by a fluid). Point 514 can correspond to a signal perturbation identified from the piezoelectric sensor output signal generated from piezoelectric device 510. Point 512 can correspond to a contact patch exit identified from the piezoelectric sensor output signal generated from piezoelectric device 510. Point 524 can correspond to a signal perturbation identified from the piezoelectric sensor output signal generated from piezoelectric device 520. Point 522 can correspond to a contact patch exit identified from the piezoelectric sensor output signal generated from piezoelectric device 520. Point 534 can correspond to a signal perturbation identified from the piezoelectric sensor output signal generated from piezoelectric device 530. Point 532 can correspond to a contact patch exit identified from the piezoelectric sensor output signal generated from piezoelectric device 530.

As demonstrated by FIG. 11, a rough estimate of the two-dimensional shape of the portion of the contact patch that is in contact with the static surface can be determined based at least in part on the points 512, 514, 522, 524, 532, and 534. Increased resolution for the estimate of the two-dimensional shape can be provided by using additional piezoelectric sensors.

Figure 12:
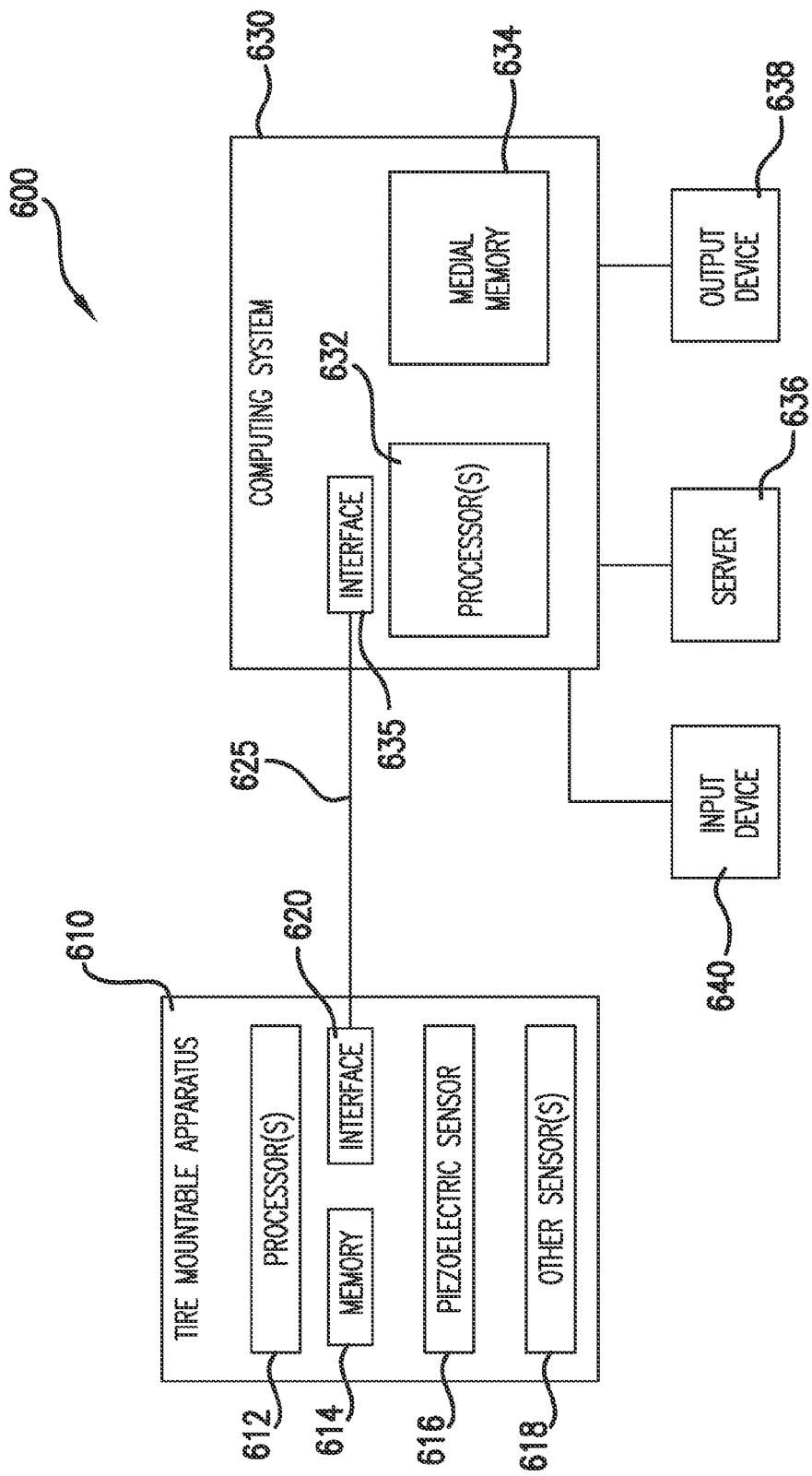
FIG. 12 depicts a system for analyzing a contact patch of a tire during a hydroplaning event according to example embodiments of the present disclosure.

FIG. 12 depicts an example system 600 that can be used to analyze a contact patch of a tire during a hydroplaning event according to example embodiments of the present disclosure. The system 600 can include a tire mountable apparatus 610 that can be in communication with a computing system 630 over a suitable communications link 625. The communications link 625 can include any number or combination of wired or wireless communication links. For instance, the communication link can include RF communication link, a network (e.g. LAN, WAN, SAN, wireless, cellular, etc.), or other suitable communication link. Connections may be established with respect to both hardware applications and implementation in connection with a computing device (including a mobile networking apparatus) that includes hardware, software, or, where appropriate, a combination of both.

The tire mountable apparatus 610 can include a processor(s) 612 and a memory/media element 614. The processor(s) 612 can be any suitable processing device, such as a microprocessor, microcontroller, integrated circuit or other suitable processing device. The memory/media element can include single or multiple portions of one or more varieties of non-transitory computer-readable media, including, but not limited to, RAM, ROM, hard drives, flash drives, optical media, magnetic media or other memory devices.

The tire mountable apparatus 610 can further include a piezoelectric sensor 616 configured to generate time varying piezoelectric sensor output signals indicative of the curvature of a rolling tire. The piezoelectric sensor output signals can be stored in the memory/media elements 614. The piezoelectric sensor output signals can be processed using the processor 612 according to any of the methods disclosed herein, such as the method (300) disclosed in FIG. 9. The piezoelectric sensor output signals can be communicated via an interface 620 over the communication link 625 to computing system 630. For instance, the piezoelectric sensor output signals can be communicated to the computing system 630 whenever a communication link is established between the computing system 630 and the tire mountable apparatus 610. The interface 620 can include components for interfacing with one more other computing devices, including for example, transmitters, receivers, ports, controllers, antennas, or other suitable components. The tire mountable apparatus 610 can include other sensors 618, such as a pressure sensor and/or a temperature sensor.

Computing system 630 can be any suitable computing system and can include one or more of any type of computer, computer systems or other programmable computing device, including a client computer, a server computer, an on-vehicle computing system, a desktop, a portable computer (including a laptop and a tablet), a handheld computer, a mobile phone (including a smartphone), a PDA, a display with one or more processors, a gaming device, an embedded controller, a near-field communication device, a device with applications implemented at least partly using a cloud service, and any combination and/or equivalent thereof (including touchless devices). Moreover, a computing device may be implemented using one or more networked computers, e.g., in a cluster or other distributed computing system.

The computing/processing devices of FIG. 12 may be adapted to function as a special-purpose machine providing desired functionality by accessing software instructions rendered in a computer-readable form stored in one or more of the memory/media elements. When software is used, any suitable programming, scripting, or other type of language or combinations of languages may be used to implement the teachings contained herein.

In one implementation, one or more of the processors in the system 600 can execute computer-readable instructions that are stored in one or more of the memory/media elements to cause the processor to perform operations. The operations can include obtaining a piezoelectric sensor output signal from at least one piezoelectric sensor mounted in a tire; analyzing, with one or more processing devices, the piezoelectric sensor output signal to determine a contact patch entry and a contact patch exit for the tire; detecting, with the one or more processing devices, a signal perturbation corresponding to the hydroplaning event in the piezoelectric sensor output signal; and assessing a parameter of the contact patch based at least in part on the signal perturbation.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method of analyzing a contact patch of a tire during a hydroplaning event, comprising:
   obtaining a piezoelectric sensor output signal from at least one piezoelectric sensor mounted in a tire, the piezoelectric sensor output signal being generated at least in part during a hydroplaning event;
   analyzing, with one or more processing devices, the piezoelectric sensor output signal to determine a contact patch entry and a contact patch exit for the tire;
   detecting, with the one or more processing devices, a signal perturbation in the piezoelectric sensor output signal, the signal perturbation corresponding to the hydroplaning event and occurring at a time between a time associated with the contact patch entry and a time associated with the contact patch exit; and
   assessing a quantitative degree of hydroplaning for the tire during the hydroplaning event based at least in part on the signal perturbation,
   wherein the quantitative degree of hydroplaning indicates how much of the contact patch was separated from a static surface by a fluid during the hydroplaning event.

2. The method of claim 1, wherein the contact patch entry is determined by identifying a maximum slope in a first direction of the piezoelectric sensor output signal and the contact patch exit is determined by identifying a maximum slope in a second direction of the piezoelectric sensor output signal.

3. The method of claim 1, wherein detecting, with the one or more processing devices, a signal perturbation in the piezoelectric sensor output signal comprises analyzing, with one or more processing devices, the piezoelectric sensor output signal to identify an inflection point in the piezoelectric sensor output signal occurring between the contact patch entry and the contact patch exit.

4. The method of claim 1, wherein detecting, with the one or more processing devices, a signal perturbation in the piezoelectric sensor output signal comprises analyzing, with the one or more processing devices, the piezoelectric sensor output signal to identify a first inflection point in the piezoelectric sensor output signal and a second inflection point in the piezoelectric sensor output signal, the first inflection point and the second inflection point occurring between the contact patch entry and the contact patch exit.

5. The method of claim 4, wherein the signal perturbation is detected based at least in part on the first inflection point and the second inflection point.

6. The method of claim 5, wherein the time associated with the signal perturbation is determined as an average of a time associated with the first inflection point and a time associated with the second inflection point.

7. The method of claim 1, wherein the quantitative degree of hydroplaning is determined as follows:

$$H = \frac{t_{event} - t_{cpentry}}{t_{cpexit} - t_{cpentry}}$$

where H is the quantitative degree of hydroplaning, $t_{event}$ is a time associated with the signal perturbation, $t_{cpentry}$ is a time associated with the contact patch entry, $t_{cpexit}$ is a time associated with the contact patch exit.

8. The method of claim 1, wherein the method comprises detecting the hydroplaning event based at least in part on a rate of change of the piezoelectric sensor output signal at the contact patch entry.

9. The method of claim 1, wherein obtaining a piezoelectric sensor output signal comprises obtaining a plurality of piezoelectric sensor output signals, each piezoelectric output sensor signal generated from one of a plurality of piezoelectric sensors mounted in the tire.

10. The method of claim 9, wherein the plurality of piezoelectric sensors are mounted across a lateral width of the tire.

11. The method of claim 9, wherein detecting, with the one or more processing devices, a signal perturbation corresponding to the hydroplaning event in the piezoelectric sensor output signal comprises detecting a plurality of signal perturbations, each signal perturbation associated with one of the plurality of piezoelectric sensor output signals.

12. The method of claim 11, wherein assessing a parameter indicative of a deformation of the contact patch related to the hydroplaning event based at least in part on the signal perturbation comprises determining one or more parameters indicative of a shape of the contact patch based at least in part on the plurality of signal perturbations.

13. A system for analyzing a contact patch of a tire during a hydroplaning event, comprising:
at least one piezoelectric sensor configured to generate a piezoelectric sensor output signal representative of a time varying curvature of a tire during tire rotation;
one or more processing devices, the one or more processing devices configured to execute computer-readable instructions stored in one or more computer readable media that when executed by the one or more processing devices cause the one or more processing devices to perform operations comprising:
obtaining a piezoelectric sensor output signal from at least one piezoelectric sensor mounted in a tire, the piezoelectric sensor output signal being generated at least in part during a hydroplaning event;
analyzing, with one or more processing devices, the piezoelectric sensor output signal to determine a contact patch entry and a contact patch exit for the tire;
detecting, with the one or more processing devices, a signal perturbation corresponding to the hydroplaning event in the piezoelectric sensor output signal, the signal perturbation occurring at a time between a time associated with the contact patch entry and a time associated with the contact patch exit; and
assessing a quantitative degree of hydroplaning for the tire during the hydroplaning event based at least in part on the signal perturbation,
wherein the quantitative degree of hydroplaning indicates how much of the contact patch was separated from a static surface by a fluid during the hydroplaning event.

* * * * *